(12) United States Patent
Erramilli et al.

(10) Patent No.: US 8,289,872 B2
(45) Date of Patent: Oct. 16, 2012

(54) SYSTEM AND METHOD FOR ASSIGNING INFORMATION CATEGORIES TO MULTICAST GROUPS

(75) Inventors: Shobha Erramilli, Holmdel, NJ (US); Shrirang Gadgil, Eatontown, NJ (US); Narayanan Natarajan, Marlboro, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 293 days.

(21) Appl. No.: 12/603,891

(22) Filed: Oct. 22, 2009

(65) Prior Publication Data

US 2011/0019672 A1    Jan. 27, 2011

Related U.S. Application Data

(60) Provisional application No. 61/228,263, filed on Jul. 24, 2009.

(51) Int. Cl.
*H04L 12/26* (2006.01)
(52) U.S. Cl. ...................................................... 370/252
(58) Field of Classification Search .................. 370/241, 370/252, 254–255, 351, 389–390, 392–393, 370/229, 235, 238
See application file for complete search history.

(56) References Cited

U.S. PATENT DOCUMENTS
| | | | |
|---|---|---|---|
| 2007/0140245 A1 | 6/2007 | Anjum et al. | |
| 2008/0025334 A1 | 1/2008 | Smith et al. | |
| 2009/0073993 A1 | 3/2009 | Qureshi et al. | |

OTHER PUBLICATIONS

S. Gagdil, Y. Lin, N. Natarajan, "Planning and Management of Dynamic Publish-Subscriber Communications in Tactical Networks Using IP Multicast", Oct. 2007, Milcom 2007, pp. 1-7.*
S. Gadgil, Y. Lin, N. Natarajan, Planning and Management of Dynamic Publish-Subscriber Communications in Tactical Networks Using IP Multicast, Milcom 2007, pp. 1-7, Oct. 2007.
S. Cevher, M. Uyar, M. Fecko, et al., Interest-Aware and Bandwidth Efficient Multicast Group Planning, Milcom 2008, Nov. 2008, pp. 1-7.
IETF RTC 3171 Aug. 2001: IANA Guidelines for IPv4 Multicast Address Assignments.
T. Camp, Y. Liu, An Adaptive Mesh-based Protocol for Geocast Routing, Journal of Parallel and Distributed Computing, vol. 63, Issues 2, Feb. 2003, pp. 196-213.
D. Frey, G. Roman, Context-Aware Publish Subscribed in Mobile Ad Hoc Networks, Technical Report, Dept. of EECS Washington University, Jan. 2007.
OMG Publications, Aug. 2006: The Real-time Publish-Subscribe Wire Protocol DDS Interoperability Wire Protocol Specification, http://www.omg..org/docs/ptc/06-08-02.pdf.
J. Lee and M. Cheng, Hierarchical Level-based IP Multicasting for Tactical Networks, Milcom 1999, vol. 1, pp. 15-19, Oct. 1999.

* cited by examiner

*Primary Examiner* — Omar Ghowrwal
(74) *Attorney, Agent, or Firm* — Philip J. Feig

(57) ABSTRACT

A system and method for determining an efficient assignment of information categories to multicast addresses is described. In one embodiment, the assignment takes into account the overlapping info cation needs of the subscriber nodes and the network bandwidth that will be consumed in the dissemination of each information category based on its size and the frequency of dissemination. In another embodiment, the assignment takes into consideration the additional constraint of a quality of service network having different prioritizations associated with the information categories.

13 Claims, 6 Drawing Sheets

SYSTEM AND METHOD FOR ASSIGNING INFORMATION CATEGORIES TO MULTICAST GROUPS

This application claims the benefit of U.S. Provisional Application 61/228,263, filed Jul. 24, 2009, incorporated herein in its entirety.

FIELD OF THE INVENTION

The present invention relates generally to the field of networking, and more particularly to methods and systems for disseminating information using multicast services.

BACKGROUND

Network-centric tactical environments rely heavily on the timely dissemination of critical information related to sensors, situational awareness, command, and control to soldiers, planners, and other receivers in order to execute a successful mission. Typically, these environments use a communications network including hundreds of platforms, sensors, decision nodes, and computers communicating with each other to exchange information to support collaborative decision making in a real-time, dynamically changing, and critical situation.

The communications network used in these environments often disseminate information using publish-subscribe ("pub-sub") communication paradigm with Internet Protocol ("IP") multicast services as the transport mechanism. In pub-sub, the sender or publisher sends messages without knowing the existence or identity of the receivers or subscribers. These messages are received only by those that have subscribed to the information contained in the messages. A subscriber can receive information related to a particular content regardless of the identity of the publisher. This paradigm is beneficial in environments where the communicating parties are frequently changing, such as in a tactical network.

IP multicasting is a networking technology that sends information as a packet to a group of destinations simultaneously over a link once. The nodes in the network replicate the packet to reach the multiple destinations as needed when downstream receivers are reached over multiple links. A multicast group is a set of receiver nodes that elect to receive information or packets sent to the group. A multicast address is used by a source node to send packets to each of the receiver nodes associated with the multicast group and by the receiver nodes to receive the packets.

It is often the case in network-centric tactical environments, that the number of multicast addresses and groups that can be used for pub-sub communications is limited. In such cases, it is necessary to disseminate information in an efficient manner.

SUMMARY

This Summary is provided to introduce a selection of concepts in a simplified form that are further described in the Detailed Description below. This Summary is not intended to identify essential features of the invention or claimed subject matter, nor is it intended to be used in determining the scope of the claimed subject matter.

The present invention pertains to a technology that determines an efficient assignment of information categories to multicast addresses. In an embodiment, the assignment is employed in a tactical network utilizing a publish-subscribe communications paradigm with Internet Protocol ("IP") multicast services as the transport mechanism. The assignment is calculated considering the overlapping information needs of the subscribers and the network bandwidth that will be consumed in the dissemination of each information category based on its size and the frequency of dissemination.

In an embodiment, the tactical network is represented by the following: a set of k subscribers, $S=\{s_1, \ldots, s_k\}$; a set of n multicast addresses, $A=\{a_1, \ldots, a_n\}$; a set of m information categories, $C=\{c_1, \ldots, c_m\}$; a bandwidth factor, $B_m$, for each category, that is a weighted factor representing the size of information category m and its frequency of dissemination; and a function, $N(S, C)$, which denotes the subscribers' needs for the information categories. The goal is to find a near optimal assignment solution, $M(C,A)$, that minimizes wastage in the network. Wastage is represented by a wastage penalty, W that is a function of the unwanted categories received by the subscribers and the bandwidth factor of each of these categories.

In another embodiment, the assignment of the information categories to multicast addresses takes into consideration the additional constraint of a quality of service (QoS) network having different prioritizations associated with the information categories. In this embodiment, there are two priority levels. The information categories, C, multicast addresses, A, subscribers, S, and the subscribers' information needs function, N, are separated into two classes, where each class represents a different priority level. The assignments are made using subscribers, information categories, and multicast addresses from the same priority. This enables the dissemination of messages to high priority users with a different QoS priority by the network.

BRIEF DESCRIPTION OF THE DRAWINGS

The subject matter disclosed is illustrated by way of example, and not by way of limitation, in the figures of the accompanying drawings in which the like reference numerals refer to similar elements and in which.

DETAILED DESCRIPTION

Figure 1:
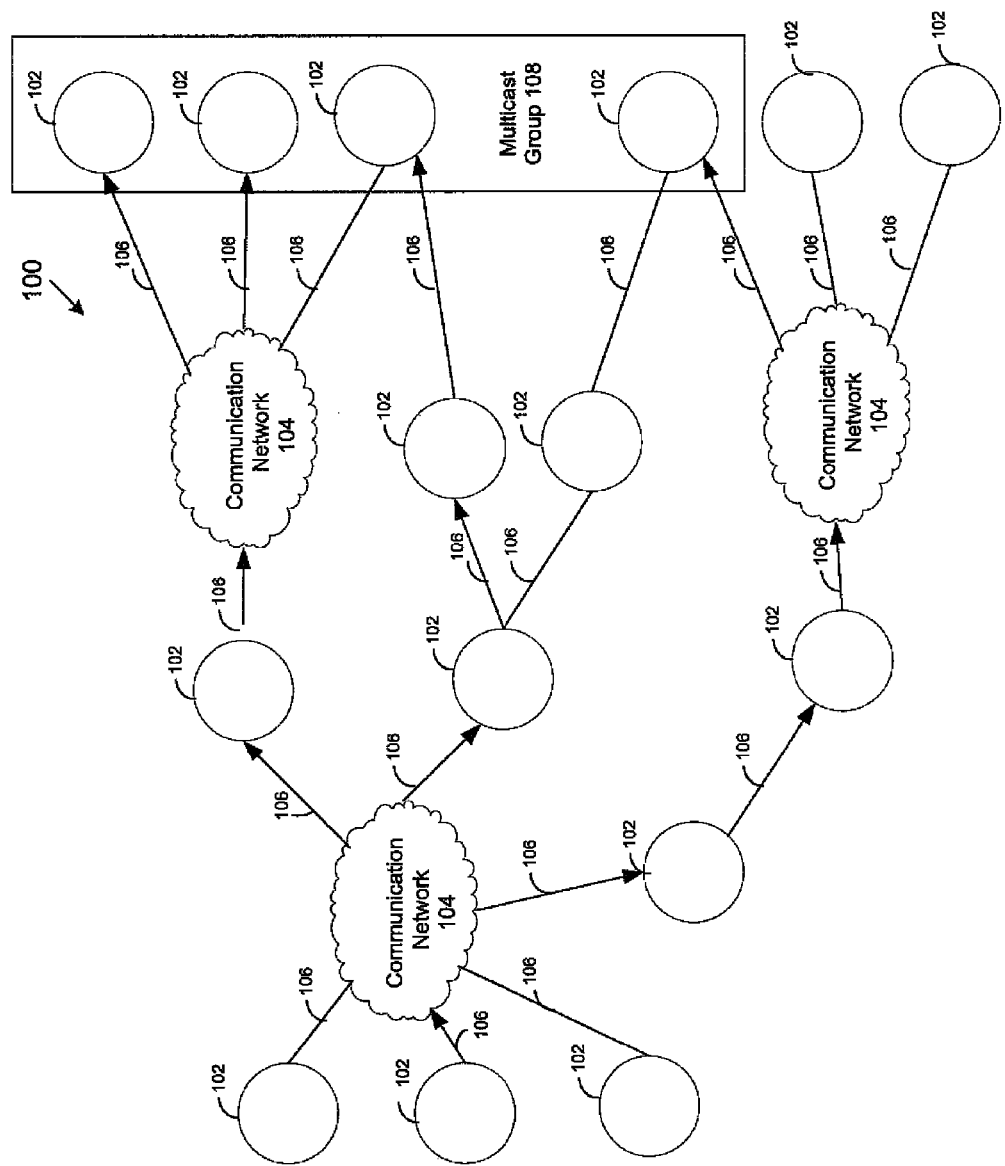
FIG. 1 illustrates a tactical network in accordance with a preferred embodiment.

FIG. 1 shows an embodiment of a network-centric tactical environment or network 100 including a number of nodes 102, one or more communication networks 104, and one or more links 106 used to connect a node 102 to a communication network 104 in order to facilitate communication between the nodes 102. The tactical network 100 may be used by one or more military units for communicating data such as voice data, position telemetry, sensor data, and real-time video. Nodes 102 in the tactical network can be tactical radios, transmitters, satellites, receivers, workstations, computers, servers, wireless handheld devices, and/or other computing devices. The links 106 may be wired and/or wireless connections that facilitate the transmission of data between the nodes 102 and the communication networks 104.

A communication network 104 can be any type of network that facilitates the transmission of data between the nodes 102. There may be various types of communication networks 104 within the tactical network 100 and each may be operating using a different communication protocol within a different network architecture. For instance, one communication network 104 may utilize an Ethernet local area network along with radio links to satellites and field units that operate at different throughputs and latencies. Tactical radios may communicate using both satellite communications and a direct radio frequency link. A high frequency network may be employed for long range transmissions. In addition, there are a number of routers, gateways, and other networking components (not shown) that are part of the communications network 104 and are used to facilitate the transmission of data between the various nodes 102.

In a preferred embodiment, the tactical network 100 utilizes a pub-sub communication paradigm with IP multicast services as the transport mechanism. In the pub-sub communications paradigm, the sender or publisher sends messages without knowing the existence or identity of the receivers or subscribers. A subscriber can receive info nation related to a particular content regardless of the identity of the publisher.

In a topic-based pub-sub system, information is disseminated in information categories. A receiver subscribes to a particular information category and they receive all the messages published to each of the information categories that they subscribed to. All subscribers to an information category receive all the same messages. The publisher defines the information category and generates the messages for that topic.

Pub-sub communications use IP multicast by mapping each information category to an IP multicast address. Many categories may be mapped to a single multicast address. Both senders and receivers are aware of these mappings. A receiver interested in a category joins the corresponding multicast group. A sender publishes information belonging to a category using the corresponding multicast address as the destination address.

Preferably, the tactical network 100 uses multicasting to implement the pub-sub communication paradigm. Each information category is associated with a multicast group having a specific multicast address. The multicast group consists of those users or nodes 102 in the tactical network 100 subscribed to a particular information category. Each multicast group is associated with a specific multicast address and preferably, the tactical network 100 uses multicast addresses in accordance with the Internet Protocol version 6 ("IPv6") addressing scheme.

Referring to FIG. 1, there is shown a multicast group 108 consisting of subscriber nodes 102 associated with information category $c_m$. A publisher generates a message associated with information category $c_m$ which is disseminated to the multicast group 108 through a number of links, routers, and networks. Each node 102 in the network 100 that receives the message replicates the message and forwards it to the next node 102 in the path to the destination receiver 102 (shown in FIG. 1 through the arrow-ended links).

Figure 2:
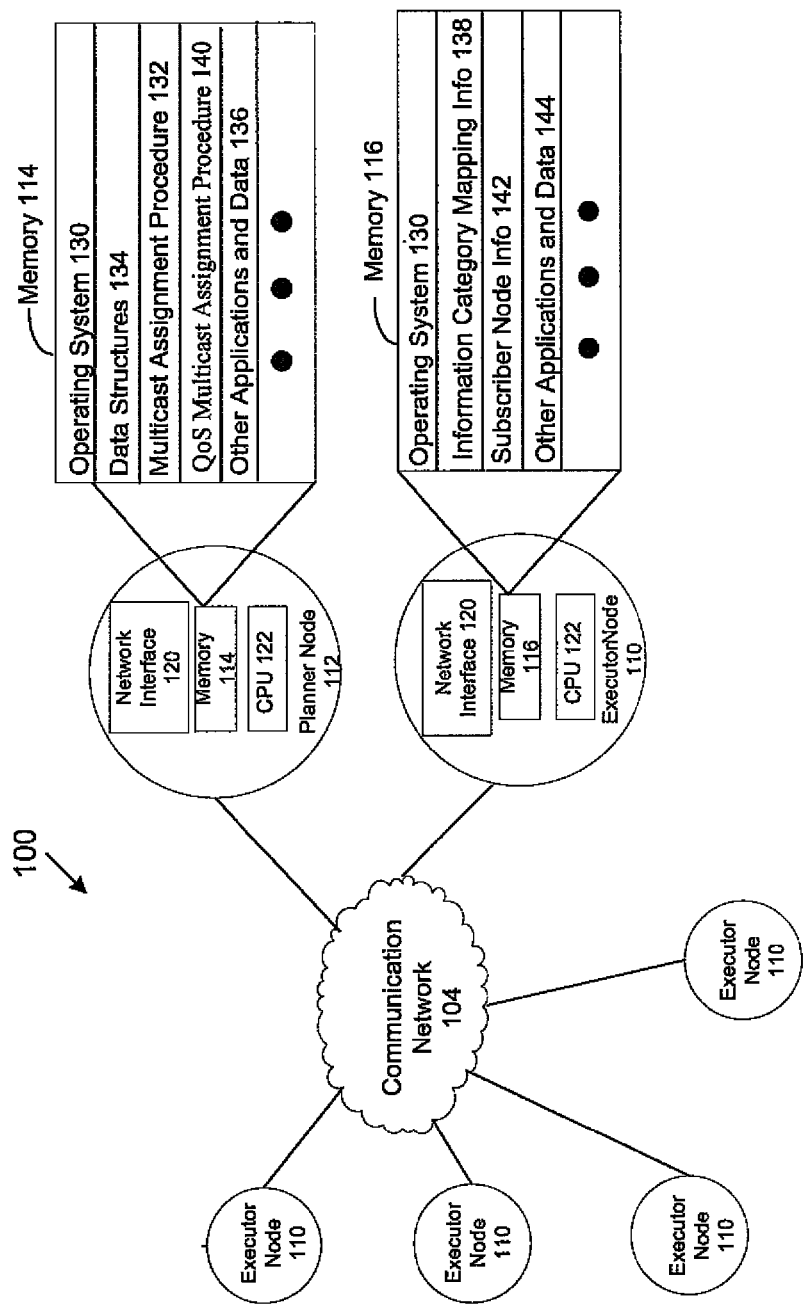
FIG. 2 illustrates a tactical network having planner and executor nodes in accordance with a preferred embodiment.

In networks using multicast services, there needs to be a mechanism that determines the assignment of information categories to multicast groups. Referring to FIG. 2, the tactical network 100 utilizes a planner 112 resident in a single node to assign each information category to a particular multicast address. The planner node 112 disseminates the multicast assignments for each of the information categories to executor nodes 110 belonging to the multicast group associated with the information category. An executor node 110 subscribes the users or subscribers associated with the executor node 110 to one or more multicast groups based on the multicast group assignments received from the planner 112 and is responsible for receiving the subscribed information categories.

The planner node 112 has, at a minimum, a network interface 120 for facilitating network communication, a memory 114, and a processor or CPU 122. The memory 114 can be a non-transitory computer readable medium that can store executable procedures, applications, and data. It can be any type of memory device (e.g., random access memory, read-only memory, etc.), magnetic storage, volatile storage, non-volatile storage, optical storage, DVD, CD, and the like. The memory 114 can also include one or more external storage devices or remotely located storage devices. The memory 114 can contain instructions and data as follows:
- an operating system 130;
- a multicast assignment procedure 132;
- a QoS multicast assignment procedure 140;
- various data structures used in the multicast assignment procedures 134; and
- various other applications and data 136.

Each executor node 110 has, at a minimum, a network interface 120 for facilitating network communication, a memory 116, and a processor or CPU 122. The memory 116 can be a computer readable medium that can store executable procedures, applications, and data. It can be any type of memory device (e.g., random access memory, read-only memory, etc.), magnetic storage, volatile storage, non-volatile storage, optical storage, DVD, CD, and the like. The memory 116 can also include one or more external storage devices or remotely located storage devices. The memory can contain instructions and data as follows:
- an operating system 130;
- mapping information related to assignments of information categories to multicast addresses 138;
- subscriber node information 142; and
- various other applications and data 144.

Multicasting uses keys (not shown) to ensure the security of the transmission. For each transmission or publication, a session key is transmitted along with the content and is encrypted with a public key of the subscriber. For security reasons, session keys are frequently changed which causes a problem of ensuring that the subscribers to a multicast group possess the keys needed to decrypt the transmission. The multicast key problem is further exacerbated by the dynamics of a multicast group where members can join and leave a group frequently thereby requiring the distribution of new group keys. The network traffic used in updating the keys frequently increases the network's bandwidth and reduces the efficiency of the network for use in the transmission of mission critical information. One way of simplifying this key management problem is by minimizing the number of multicast groups that are used in the tactical network.

Another problem with the use of multicasting in a tactical network is that a subscriber may be limited to the number of multicast groups that it can subscribe to yet still needs to obtain enough information to perform its mission. For example, tactical radios are limited to the number of multicast groups that they can subscribe to for security reasons. This limitation is done to reduce the amount of highly sensitive data that is stored in the radio.

Additionally, tactical networks are typically bandwidth constrained. It is often the case that there is more data to be transmitted than available bandwidth at any given point in time. This can be attributable to the limitations imposed on the network architecture and/or the amount of communications transmitted at any given point in time.

Furthermore, since the number of multicast addresses and groups that can be used for pub-sub communications is limited, multiple information categories are often mapped to a common multicast address. In such cases, all members of the multicast group receive all the messages associated with these information categories irrespective of subscribing to the information category. Accordingly, a subscriber may join a multicast group to receive messages of one particular information category and instead receive messages from several unwanted information categories.

For these reasons, it is beneficial to minimize the dissemination of unwanted information in order to decrease the unnecessary use or waste of network resources and to reduce the information load on the receiving nodes. This can be achieved by assigning the information categories to multicast groups taking into consideration the overlapping information needs of the subscribers and the consumption of the network bandwidth that is consumed in the dissemination of the categories based on their size and frequency of publication. Attention now turns to a description of the manner in which this assignment is performed.

The problem can be described mathematically as follows. Consider a set S of k subscribers $S=\{s_1, \ldots, s_k\}$, a set C of m information categories $C=\{c_1, \ldots, c_m\}$, and a set A of n multicast addresses $A=\{a_1, \ldots, a_n\}$. The information needs of each subscriber is expressed by a boolean function, $N(s, c)$, where $N(s, c)=1$ indicates that subscriber s needs information category c and where $N(s, c)=0$ indicates that subscriber s is not interested in information category c.

Given these inputs, the goal is to find the best assignment function $M(C, A)$ that assigns a multicast address from A to each information category in C. The function $M(c, a)=1$ if and only if category c is assigned address a (this means that a publisher that publishes information belonging to information category c will use multicast address a for dissemination). It is generally expected that the number of information categories will be greater than the number of available multicast addresses and the mapping function will result in assigning the same multicast address to several information categories.

Since a multicast address may be used to disseminate several information categories, a subscriber desiring information belonging to one of these categories ends up receiving all categories that are assigned the same address, including categories that are not subscribed to. This results in unnecessary information being transported in the network using up network resources. This wastage increases with the bandwidth consumed by unnecessary information. Accordingly, it is an objective of the address assignment function, M, that the categories are assigned in an efficient manner so that the network resources that are consumed in delivering unwanted information to subscribers are minimized. As such, additional consideration needs to be given to the varying frequency of publication since different categories publish at different rates and to the various data sizes of the information categories.

The objective function for the multicast assignment is the minimization of wastage in the network. The wastage for the network is the sum of wastages for each category. The wastage attributed to each category is a function of the bandwidth used in the dissemination of information to subscribers that are not subscribed to the category. The wastage is defined as follows:

$$W = \sum_{\forall m \in C} \square \left( B_m * \sum_{\forall s \in S} \square M_2(s, m) \right),$$

where $B_m$ is the bandwidth factor and $M_2(s,m)$ expresses the wastage delivery relationship between subscribers and categories ($M_2(s,m)=1$ if subscriber s has not subscribed to m but receives m as a result of the address assignment; that is $M_2(s,m)=1$ if and only if for some a and $c_1$, $N(s,m)=0$ and $M(m,a)=1$, and $N(s,c_1)=1$ and $M(c_1,a)==1$).

In a preferred embodiment, the solution of the assignment problem uses simulated annealing. However, the technology described herein is not constrained to simulated annealing and other search and optimization techniques can be used, such as without limitation, linear programming, adaptive simulated annealing, combinatorial optimization, and the like, and any combination thereof.

Simulated annealing is a technique often used to solve large combinatorial problems by searching through the problem space in a manner that reduces a defined objective function. An initial solution is perturbed repeatedly in small steps and the new solution is accepted or not based on the constraints. All steps that result in a better solution or equally good solution are accepted. Steps that result in a worse solution are also accepted based on a probability that they will lead to better solutions.

In an analogy to the metallurgical annealing method, where a metal is cooled gradually from a high temperature state in order to achieve its lowest energy state, this approach starts from a high temperature and reduces the temperature in stages according to a cooling rate until the desired low temperature is reached. At each temperature stage, NumTrials solutions are generated and evaluated. At each step i, the objective function $P_i$ is evaluated. Steps that result in a worse solution are accepted based on a probability using the inequality
$r < e^{-\Delta P/T}$ where r is a random number between 0 and 1, $\Delta P = (P_i - P_{i-1})$, and T is the temperature at that stage.

The inequality results in the method accepting worse solutions with a higher probability at high temperatures, thus preventing the method from converging to a local minimum. The process is combined with specific objective functions and constraints to receive an approximately optimal solution.

The simulated annealing process starts with an initial random assignment of categories to addresses and then repeatedly generates new assignments, $M'(c,a)$, that are slightly different from the previous or current assignment, $M(c,a)$. Two basic moves are used to generate new assignments. In the first move, two random categories are selected and their assigned addresses are swapped. This move maintains the number of categories assigned to each multicast address and only mixes the categories assigned to them. It is useful in determining the categories that can be grouped together to reduce wastage. In the second move, one random category is selected and it is assigned a randomly selected address. This move not only changes the assignment of categories to multicast addresses but also changes the number of categories assigned to a multicast address. It is useful in cases where a category's mix of subscribers and bandwidth needs are such that it is best to assign the category to its own multicast address and not be grouped with others.

In either case, the wastage or penalty for the new assignments or solutions, W, is computed in order to determine which solution is preferred. If the new solution, $M'(C,A)$, is better than the current solution, M(C,A), or the inequality in the simulated annealing algorithm is met, the new solution is accepted as the current solution. Otherwise, the new solution is rejected and the previous solution remains. This process is repeated until the final temperature stage is completed.

Figure 3:
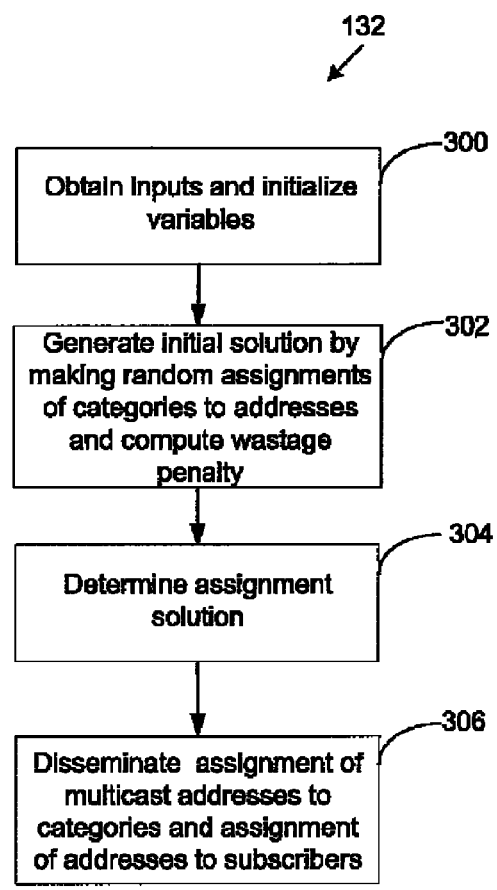
FIG. 3 is a flow chart illustrating the multicast assignment process in accordance with a preferred embodiment.

Turning now to FIG. 3, there is shown the steps used in the multicast assignment procedure 132. Initially, in step 300, inputs to the multicast assignment procedure 132 are described using certain data structures which are enumerated and initialized as follows:

S is a set of k subscribers, $S=\{s_1, \ldots, s_k\}$;

C is a set of in information categories, $C=\{c_1, \ldots, c_m\}$;

B is a set of m bandwidth factors, $B=\{b_1, \ldots, b_m\}$, where $b_m$, represents the bandwidth factor associated with category M. The bandwidth factors are a predetermined weight that is assigned initially to each category m. Each bandwidth factor is a function of the frequency and message of the information disseminated in each category normalized to a particular category. For example, in a tactical network, it can be normalized to the information category associated with the highest echelon in the network, such as a brigade. The bandwidth factor of the brigade level information category is set to 1 while all others are stated in relation to the brigade level category;

A is a set of n multicast addresses, $A=\{a_1, \ldots, a_n\}$; and

N(s,c) is a list representing the subscriber's needs, where N(s,c)=1 if subscribers needs information category c, and N(s,c)=0 if subscriber s does not need information category c.

In addition, the variables used in the assignment solution iteration are described and initialized as follows:

$T_{init}$, the initial temperature used in the simulated annealing process ($r<e^{-\Delta P/T}$). This value is set so that the simulated annealing process picks 50% of the solutions that are worse than the previous solution. The initial value is set between 10 and 30;

$T_{final}$, the final temperature used in the simulated annealing process. It is set so that only 0.1% of the worse solutions is picked by the process and is initialized between 0.1 and 0.5;

T, is the temperature variable used at the current temperature stage in the simulated annealing process, and is set initially to $T_{init}$;

n, the number of iterations and is initialized to zero, n=0;

NumTrials is a value indicating the number of iterations that the simulated annealing process iterates through at each temperature stage. This value is initialized based on the dimension of the problem and typically set on average to two to four times the size of the problem. In this case, the size of the problem is based on the number of information categories that need to be assigned a multicast address. For example, if there are between 100-200 such categories, then NumTrials would be set between 200-400 iterations; and α, the cooling rate used in the simulated annealing process. Preferably, it is initialized to a value between 0.8 and 0.99. A higher value for the cooling rate produces a more optimal solution yet takes longer to compute. A lower value within that range produces a less optimal solution that can be computed quickly.

Next, the procedure 132 generates an initial solution, M(C, A,), by randomly assigning information categories to multicast addresses. For each category $c_i$ in C, a random address $a_j$ from A is selected and $c_i$ is assigned to $a_j$ (i.e., set $N(c_i,a_j)=1$). This is repeated for all information categories of C (step 302). In addition, the wastage penalty for this initial solution is computed. In order to do this, the function C) is computed as follows: $M_2(s, c)=1$ if subscribers has not subscribed to c but receives c as a result of the address assignment; that is $M_2(s, c)=1$ if and only if for some a and $c_1$, $N(s,c)=0$ and $M(c,a)=1$, and $N(s,c_1)=1$ and $M(c_1,a)=1$. Then the wastage penalty, W, is computed as follows:

$$W = \sum_{\forall m \in C} \square \left( B_m * \sum_{\forall s \in S} \square M_2(s, m) \right)$$

(step 302).

Figure 4:
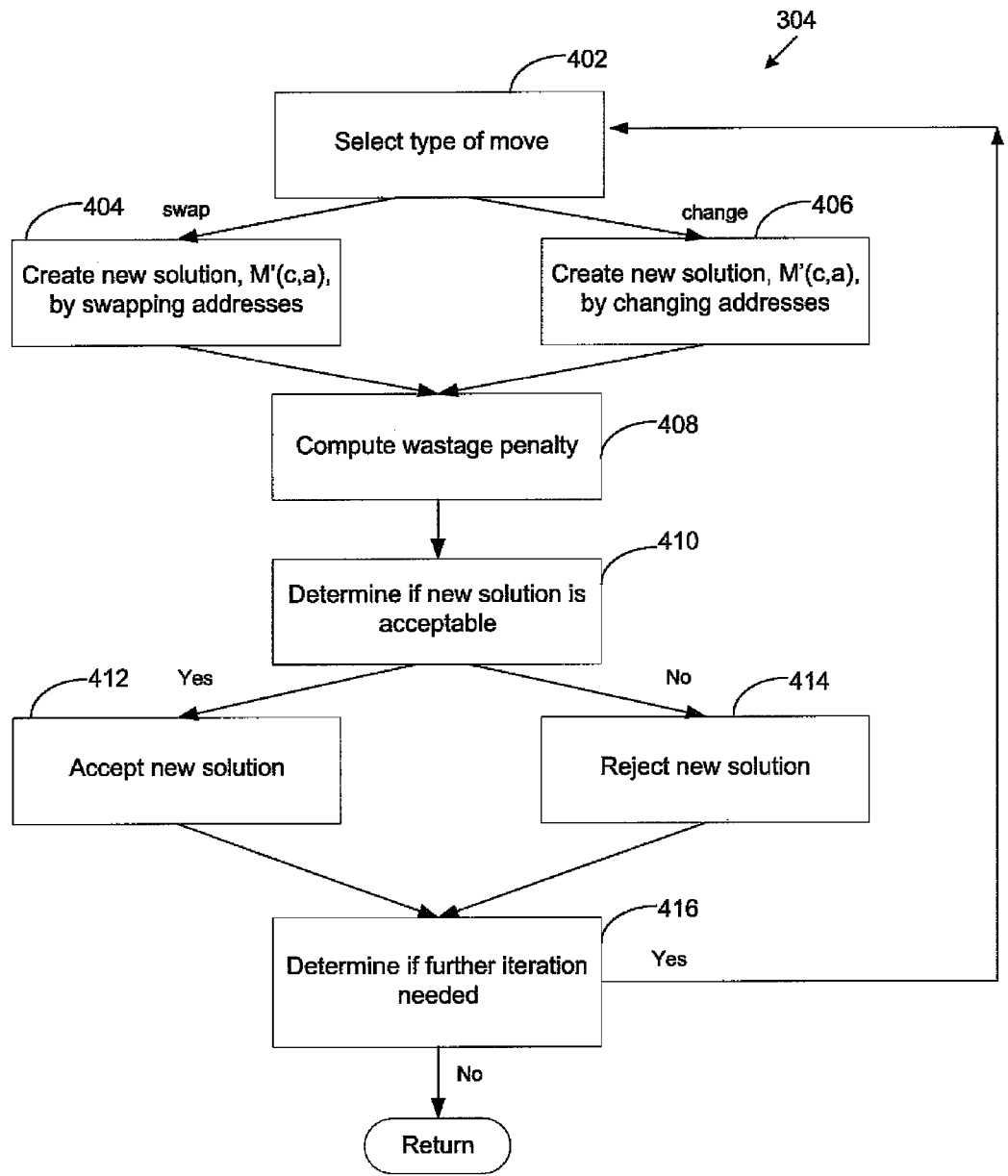
FIG. 4 is a flow chart illustrating additional steps used in the multicast assignment process shown in FIG. 3.

Now that an initial assignment and penalty have been computed, the procedure 132 utilizes a mathematical technique to determine a near optimal assignment solution, M(C,A) (step 304). Referring to FIG. 4, there is shown the steps used to determine the near optimal assignment solution. The procedure 132 produces a new assignment, compares it to an existing assignment, determines which assignment is acceptable, and then iterates this process until the wastage penalty for the current assignment meets a predetermined threshold.

Certain data structures are used and they are described below:

M(C,A) is the assignment solution, where M(c, a)=1 indicates that a publisher publishing information belonging to category c uses the multicast address a for dissemination and where M(c, a)=0 indicates that a publisher publishing information belonging to category c does not use the multicast address a;

M'(C,A) is a candidate solution that is generated and compared against the current solution, M(C,A);

$M_2(S, C)$ expresses the wastage delivery relationship between subscribers and categories. $M_2(s,c)=1$ if subscriber s has not subscribed to c but receives c as a result of the address assignment. That is $M_2(s,c)=1$ if and only if for some a and $c_1$, $N(s,c)=0$ and $N(c,a)=1$ and $N(s,c_1)=1$ and $M(c_1,a)=1$.

$M_3(S,A)$ expresses the relationship between subscribers and addresses, where $M_3(s_k,a_j)=1$, if and only if there exists at least one category $c_j$ for which $N(s_k, c_j)=1$ and $M(c_j,a_j)=1$;

$B_m$ represents the bandwidth factor associated with category m;

W is the wastage penalty, $$W = \sum_{\forall m \in C} \square \left( B_m * \sum_{\forall s \in S} \square M_2(s, m) \right).$$

The procedure 132 starts off with randomly selecting the type of move that will modify the current solution (step 402). There are two possible ways in which the solution can be modified. In the first move (step 404), two random categories are selected and their assigned addresses are swapped. For example, random categories $c_i$ and $c_j$ are selected and assigned to addresses, $a_l$ and $a_m$ resulting in $M'(c_i,a_l)=0$, $M'(c_i, a_m)=0$, $M'(c_i, a_m)=1$; and $M'(c_j, a_l)=1$. In the second move (step 406), one random category is selected and it is assigned a randomly selected address. For example, select random category, $c_m$, assigned to address $a_n$ and random address $a_p$, then $M'(c_m, a_n)=0$ and $M'(c_m, a_p)=1$. The procedure randomly selects one of these moves, and based on the selection updates the new solution, M' (c,a) accordingly.

Next, in step 408, the wastage penalty is computed for the new solution is calculated as follows:

$$W = \sum_{\forall m \in C} \square \left( B_m * \sum_{\forall s \in S} \square M_2(s, m) \right).$$

In addition, $M_3(S,A)$ is computed from $M(C,A)$. For each subscriber $s_k$ and each address $a_j$, $M_3(S,A)=1$, if and only if there exists at least one category $c_l$ for which $N(s_k,c_l)=1$ and $M(c_l, a_j)=1$. In other words, $M_3(s_k,a_j)=1$ subscriber $s_k$ needs category $c_l$ that is assigned to $a_j$.

In step 410, a determination is made to accept or reject the new solution based on the difference in the wastage penalty between the two solutions. The new solution is accepted if $r<e^{-\Delta P/T}$, where r is a random number between 0 and 1, $\Delta P$=penalty of $M'(C,A)$–penalty of $M(C,A)$, and T is the current temperature. If the new solution satisfies this condition (step 412), the new solution is kept as the current solution, $M(C, A)=M'(C,A)$, otherwise (step 414), the current solution, $M(C,A)$, is left unaltered.

Next, in step 416, a determination is made as to whether additional processing is needed. At each temperature, T, there is a set number of iterations that are performed before the temperature is changed. In this case, NumTrials denotes the number of iterations made at the current temperature T. If n<NumTrials, the procedure 132 takes on another iteration and flow continues back to step 402. Otherwise, the temperature, T, is adjusted by the cooling factor T=T*a. If the current temperature, T, exceeds the final temperature, $T_{final}$, the procedure 132 makes another iteration of assignments and the flow proceeds back to step 402. Otherwise, the procedure stops since a near optimal solution has been determined.

Referring back to FIG. 3, once the assignment solution has been determined, $M(C,A)$ and $M_3(S,A)$ are disseminated in step 306. The entire solution is represented by $M(C,A)$ and $M_3(S,A)$, where M(c, a)=1 indicates that a publisher publishing information belonging to category c uses the multicast address a for dissemination, M(c, a)=0 indicates that a publisher publishing information belonging to category c does not use the multicast address a for dissemination, and $M_3(S,A)$ indicates the subscription of subscriber s to multicast address a as a result of the assignment solution.

The planner node 112, in step 306, disseminates these assignments to the appropriate executor nodes 110. The assignments of the multicast address to categories, $M(C,A)$, is disseminated to the executor nodes 110 associated with the publishers of the information categories and the assignment of the subscribers to multicast addresses, $M_3(S,A)$, is disseminated to the executor nodes 110 associated with the subscribers.

The preceding description described an embodiment where the information needs of each of the subscribers were assumed to be of the same priority. However, quite often, in tactical networks, there is an operational need to deliver information with varying quality of service ("QoS") to different subscribers. For example, when a soldier in a platoon detects a mine, this information should be disseminated to other soldiers in the battlefront with higher criticality compared to a commander in the rear. Current day multicast schemes do not support information delivery with varying QoS using a single multicast address. Thus, the operational need can be realized only by assigning multiple multicast addresses to the same topic or event, one for each QoS class, and publishing the same topic on each assigned multicast address. To support this capability, the assignment scheme needs to be extended to consider each topic with varying degrees of QoS as multiple categories and generate address assignments satisfying the constraint that each of these categories should be mapped to a different multicast address. Attention now turns to another embodiment of the multicast assignment procedure that takes into consideration QoS related priorities and constraints.

In this embodiment, an additional constraint is added to the assignments that are generated. The problem requires that categories that need different priorities of delivery be assigned to multiple multicast addresses, one for each priority level, making sure that the subscribers to the category only receive at the desired priority. In order to simplify the assignment, a stricter constraint is used. Categories are split such that the high priority subscribers are in a separate group. The assignment is further constrained so that all categories assigned to a particular multicast address are of the same priority. Thus, all information categories published to a single multicast address are of the same priority.

The framework for implementing QoS in a tactical network can be achieved by several technologies. Typically, these technologies are employed at different levels in the network structure involving protocols and applications in the network nodes and routers, operating system support for scheduling, resource management, and real-time support, and the like. The technology described herein is not constrained to any particular QoS implementation and any can be used in the tactical network. Attention now turns to the manner in which the assignments are made with the additional QoS constraint.

Figure 5:
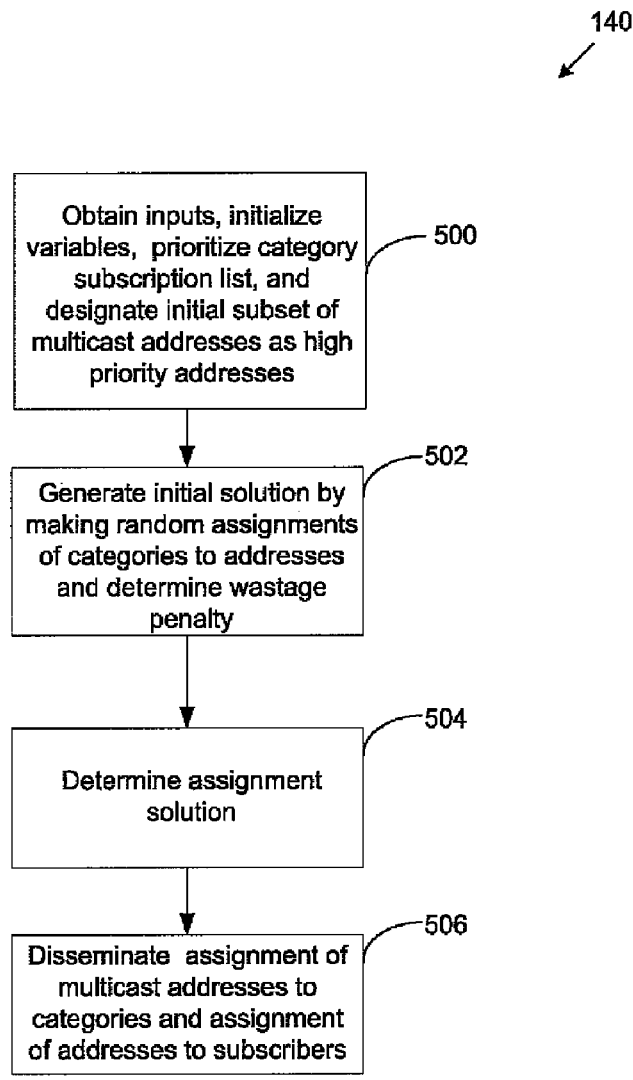
FIG. 5 is a flow chart illustrating the multicast assignment process in accordance with another preferred embodiment.

Turning now to FIG. 5, there is shown the steps used in the QoS multicast assignment procedure 140. The steps used in this embodiment are similar to those described previously with respect to FIGS. 3 and 4 and differ with respect to the prioritization of the information categories, multicast addresses, and subscriber needs list. Information category, C, is separated into two groups, with one group having a higher priority than the other information category group. The subscriber needs list, N, and multicast addresses, A, are also separated into two groups based on priorities. It should be noted that although the description shown herein is with respect to two priority levels, the technology described herein can be easily adapted to include any number of prioritization levels or classes.

Initially, in step 500, the inputs to procedure 140 are enumerated and initialized as follows:

S is a set of k subscribers, $S=\{s_1, \ldots, s_k\}$;

C' is a set of m' (m<m') information categories, $C'=\{c_1, \ldots, c_{m'}\}$, having a high priority, and C is a set of m information categories, $C=\{c_1, \ldots, c_m\}$ having a normal priority that is lower than the information categories in C'.

B is a set of m+m' bandwidth factors, $B=\{b_1, \ldots b_m, b_{m+1}, \ldots b_{m'}\}$, where $b_i$ represents the bandwidth factor associated with category i. The bandwidth factors are a predetermined weight that is assigned initially to each category;

A is a set of n multicast addresses. A is separated into two groups: $A=\{a_1, \ldots, a_l\}$ having a normal priority and $A'=\{a_{1+l}, \ldots, a_n\}$ having a high priority; and N(S,C) is a subscriber needs list where $N(s, c_m)=1$ for all s that are interested in $c_m$ that do not need high priority treatment, and $N(s, c_m')=1$ for all s that are interested in $c_{m'}$ that do need high priority treatment.

The procedure 140 designates an initial subset of the multicast addresses as being high priority addresses while the others remain with a normal priority. This is accomplished by partitioning the addresses into two sets, A and A', where A' is a set of high priority addresses. The categories that have subscribers that need priority treatment are split into two categories, such that the normal priority subscribers subscribe to category $c_m$ whereas the high priority subscribers subscribe to category $c_m'$. The initialization of the variables used in the assignment solution iteration, $T_{init}$, $T_{final}$, n, NumTrials, and a is the same as described above with respect to step 300 in FIG. 3.

In step 502, the procedure 140 generates an initial assignment solution and its associated wastage penalty. The initial solution is composed of initial assignments of information categories to multicast addresses with the additional constraint that the address that a category is mapped to has the same priority level. Preferably this is done randomly. Information categories within the high priority information category are assigned to multicast addresses having a high priority and information categories within a normal priority level are assigned to a multicast address having a normal or lower priority. The procedure 140 continues with determining the wastage penalty for the initial assignment solution in the same manner as described above with respect to step 302 (step 502).

Figure 6:
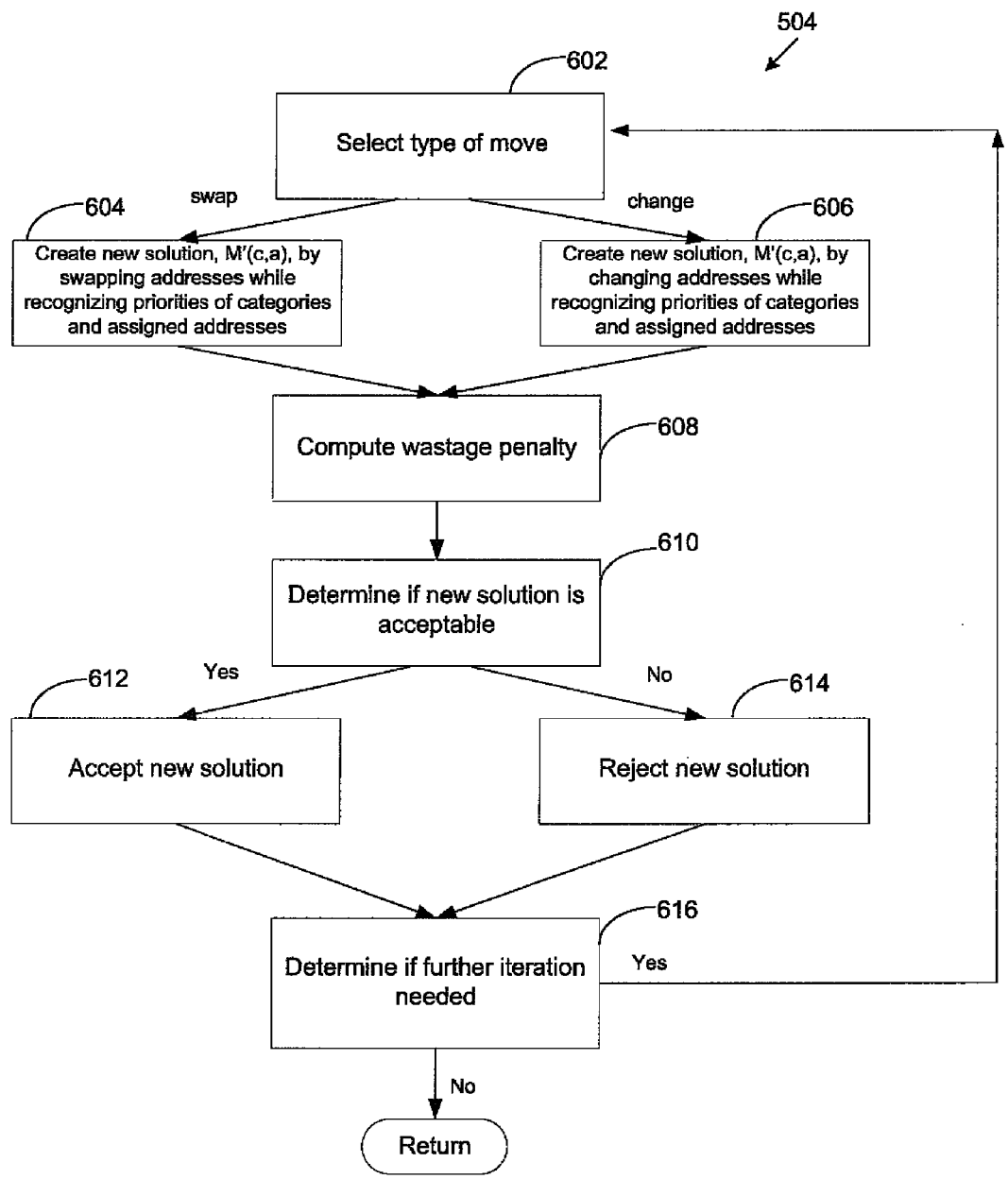
FIG. 6 is a flow chart illustrating additional steps used in the multicast assignment process shown in FIG. 5.

Next, the procedure 140 determines a near optimal assignment solution as shown in FIG. 6. The process 504 is similar to the process described above with respect to FIGS. 3 and 4 and differs in that assignments are constrained to map information categories to addresses that are in the same priority level.

The process 504 starts off with randomly selecting the type of move that will modify the current solution (step 602). There are two possible ways in which the solution can be modified. In the first move (step 604), two random categories are selected within the same priority level and their assigned addresses within the same priority level are swapped. In the second move (step 606), one random category is selected within the same priority level and it is assigned a randomly selected address in the same priority level.

Next, in step 608, the wastage penalty for the new solution is calculated as follows:

$$W = \sum_{\forall z \in C} \Box \left( B_z * \sum_{\forall s \in S} \Box M_2(s, z) \right).$$

In addition, $M_3(S,A)$ is computed from $M(C,A)$. For each subscriber $s_k$ and each address $a_j$, $M_3(S,A)=1$, if and only if there exists at least one category $c_i$ for which $N(s_k,c_i)=1$ and $M(c_i, a_j)=1$. In other words, $M_3(s_k, a_j)=1$ subscriber $s_k$ needs category $c_i$ that is assigned to $a_j$.

In step 610, a determination is made to accept or reject the new solution based on the difference in the wastage penalty between the two solutions. The new solution is accepted if $r<e^{-\Delta P/T}$, where r is a random number between 0 and 1, $\Delta P$=penalty of $M'(C,A)$−penalty of $M(C,A)$, and T is the current temperature. If the new solution satisfies this condition (step 612), the new solution is kept as the current solution, $M(C, A)=M'(C,A)$, otherwise (step 614), the current solution, $M(C,A)$, is left unaltered.

Then, in step 616, a determination is made as to whether additional processing is needed. At each temperature, T, there is a set number of iterations that are performed before the temperature is changed. In this case, NumTrials denotes the number of iterations made at the current temperature T. If n<NumTrials, the procedure 504 takes on another iteration and flow continues back to step 602. Otherwise, the temperature, T, is adjusted by the cooling factor T=T*a. If the current temperature, T, exceeds the final temperature, $T_{final}$, the procedure 504 makes another iteration of assignments and the flow proceeds back to step 602. Otherwise, the procedure 140 stops since a near optimal solution has been determined.

Referring back to FIG. 5, the entire solution is disseminated in step 506 in a similar manner as described above with respect to FIG. 3. The planner node 112, in step 506, disseminates these assignments to the appropriate executor nodes 110. The assignments of the multicast address to categories, $M(C,A)$, is disseminated to the executor nodes 110 associated with the publishers of the information categories and the assignment of the subscribers to multicast addresses, $M_3(S, A)$, is disseminated to the executor nodes 110 associated with the subscribers.

The foregoing description, for purposes of explanation, has been described with reference to specific embodiments. However, the illustrative teachings above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The technology described herein can be applied to other applications employing pub-sub over IP multicast, such as without limitation, streaming media, Internet television applications, and the like.

In addition, one skilled in the art can adapt the technology described herein to accommodate dynamic replanning. Dynamic replanning is often required in tactical networks. In the context of pub-sub communications, replanning may require subscription changes to information categories to accommodate retasking of war fighters during mission execution. A common replanning scenario is unit reorganization where a unit under one echelon is moved under another echelon (e.g., platoon under one company is moved to be under another company). The problem of computing multicast assignment reassignments for unit reorganization is to compute new address assignments to categories satisfying changes in subscriptions such that there are minimal changes in multicast group membership of subscribers. The minimization objective is motivated by a desire to minimize changes to existing multicast trees thereby minimizing disruptions to ongoing multicast traffic.

Additionally, one skilled in the art can adapt the technology described herein to accommodate information categories associated with multiple multicast addresses. In some cases, it may be more efficient to assign multiple multicast addresses to a category, even in cases where there is no varying QoS requirement for the category. The technology can be expanded to consider solutions where an information category is assigned to multiple addresses while considering the additional wastage due to the multiple transmissions.

Furthermore, one skilled in the art can adapt the technology described herein to refine the bandwidth factor to capture network resources consumed in each hop in the dissemination of the information categories in the network.

What is claimed is:

1. A method for assigning an information category to a multicast address in a network, comprising steps of:
   accessing a plurality of information categories, a plurality of subscribers, and a plurality of multicast addresses associated with the network;
   generating, by a planner, a plurality of assignment solutions, each assignment solution having a plurality of assignments, each assignment assigning a select information category to a select multicast address, each assignment solution having a wastage penalty; and selecting an assignment solution as a final assignment solution, the final assignment solution having a lower wastage penalty than most other assignment solutions;

wherein the generating step further comprises steps of:

(a) producing a current assignment solution by generating assignments for each information category;

(b) calculating the wastage penalty for the current assignment solution;

(c) producing a candidate assignment solution by generating assignments for each information category, the candidate assignment solution differing from the current assignment solution;

(d) calculating the wastage penalty for the candidate assignment solution;

(e) comparing the wastage penalty for the current assignment solution with the wastage penalty for the candidate assignment solution; and (f) updating the current assignment solution with the candidate assignment solution when the wastage penalty for the candidate assignment solution is lower than the wastage penalty for the current assignment.

2. The method of claim 1 further comprising a step of:
repeating steps (a)-(f) until a predetermined threshold is met.

3. The method of claim 1 further comprising a step of:
associating a bandwidth factor with each information category, the bandwidth factor representing a weight indicative of a size of the associated information category and frequency of dissemination; and wherein the calculating step calculates the wastage penalty for each assignment solution as a function of unwanted category data and the bandwidth factor for each information category.

4. The method of claim 1 wherein the generating step uses simulated annealing to generate the plurality of assignment solutions, and wherein the selecting step uses simulated annealing to select the final assignment solution.

5. The method of claim 1, wherein the wastage penalty is a sum of wastages for each category, and the wastage for each category is the number of subscribers that receive the category as a result of the current assignment but did not subscribe to the category.

6. A method for assigning an information category to a multicast address in a network, comprising steps of:
accessing a plurality of information categories, a plurality of subscribers, and a plurality of multicast addresses associated with the network;
generating, by a planner, a plurality of assignment solutions, each assignment solution having a plurality of assignments, each assignment assigning a select information category to a select multicast address, each assignment solution having a wastage penalty; and
selecting an assignment solution as a final assignment solution, the final assignment solution having a lower wastage penalty than most other assignment solutions further comprising:
a plurality of priority levels;
wherein each information category and each multicast address is associated with a priority level;
wherein the generating step further comprises a step of:
generating each assignment by assigning a select information category of a select priority level to a select multicast address of the same priority level.

7. A system for assigning information categories to multicast addresses in a network, comprising:
a plurality of subscribers;
a plurality of multicast addresses, each multicast address associated with one or more subscribers;
a plurality of information categories, each information category associated with one or more subscribers and one or more multicast addresses;
a plurality of assignments, each assignment assigning a select information category to a select multicast address;
a plurality of assignment solutions, each assignment solution including an assignment for each information category; and
a planner, comprising:
an assignment procedure including instructions for generating the plurality of assignment solutions and selecting a final assignment solution, each assignment solution associated with a wastage penalty, the final assignment solution having a lower wastage penalty than most other assignment solutions;
further comprising:
a plurality of priority levels;
wherein each address, each information category, and each subscriber is associated with a priority level;
a plurality of priority-based assignments, each priority-based assignment assigning a select information category associated with a select priority level with an address associated with the select priority level; and
the planner further comprises:
a priority assignment procedure including instructions for generating priority-based assignments, each priority-based assignment assigning each information category associated with a priority level with an address having the same priority level.

8. The system of claim 7, wherein the assignment procedure further comprises a simulated annealing procedure that generates the assignment solutions and determines the final assignment solution.

9. The system of claim 8, wherein the wastage penalty of an assignment solution is a sum of wastages for each category, and the wastage for each category is the number of subscribers that receive the category as a result of the current assignment but did not subscribe to the category;
wherein the assignment procedure comprises a simulated annealing procedure that generates the assignment solutions and determines the final assignment solution;
wherein the simulated annealing procedure comprises:
starting with an initial random assignment of categories to addresses;
generating a new assignment by either selecting two random categories and swapping their assigned addresses, or selecting a random category and assigning to it a randomly selected address;
using an initial temperature to be preferably between 10 and 30;
using a final temperature to be preferably between 0.1 and 0.5;
using a number of iterations for each temperature that is be preferably two to four times the number of information categories; and
using a cooling rate to be preferably between 0.8 and 0.99.

10. The system of claim 7, further comprising:
a plurality of bandwidth factors, each bandwidth factor associated with a select information category and representing a weight associated with disseminating the select information category; and wherein the wastage penalty is a function of the bandwidth factors for all information categories.

11. A computer program product comprising a non-transitory computer readable storage medium having instructions that when executed by a planner causes:

accessing a set of k subscribers, $S=\{s_1, \ldots, s_k\}$, a set of m information categories $C=\{c_1, \ldots, c_m\}$, a set of n addresses, $A=\{a_1, \ldots, a_n\}$, a set of m bandwidth factors, $B=\{b_1, \ldots, b_m\}$, each bandwidth factor associated with a select information category, each bandwidth factor representing a weight associated with disseminating messages in the select information category;

generating a plurality of assignment solutions, each assignment solution, M(C,A), having a set of assignments, where each assignment, M(c,a), assigns information category c to an address a, each assignment solution having one or more wasted assignments, each wasted assignment representing subscriber s assigned to receive information category c for which subscriber s does not need, each assignment solution having a wastage penalty, the wastage penalty is a function of the wasted assignments and the set of bandwidth factors; and selecting a select one of the assignment solutions as a final assignment solution based on the wastage penalty of the final assignment solution;

wherein the generating instructions further comprising instructions causing:

accessing a function, N(s,c), for each subscriber s and each category c, where N(s,c)=1 when subscriber s needs information category c, and N(s,c)=0 when subscriber s does not need information category c;

computing, for each assignment solution, for each subscriber s and category c, the function, $M_2(s,c)=1$ indicating subscriber s being assigned to receive information category c where subscriber s did not subscribe to information category c and $M_2(s,c)=0$, otherwise; and determining the wastage penalty for each assignment solution, $$W = \sum_{\forall z \in C} \left( B_z * \sum_{\forall s \in S} M_2(s, z) \right).$$

12. The computer program product of claim 11, wherein the computing instructions further comprise instructions causing:

selecting the final assignment solution as having a lower wastage penalty than the wastage penalties associated with most other assignment solutions.

13. The computer program product of claim 11, wherein the generating instructions further comprise instructions causing:

accessing a plurality of priority levels;

associating each information category, each subscriber, and each address with a select priority level; and for each assignment solution, making assignments where each information category of a select priority level is assigned an address having the same priority level.

* * * * *